United States Patent
Hagen

(10) Patent No.: US 10,549,628 B2
(45) Date of Patent: Feb. 4, 2020

(54) FUEL SYSTEM FOR A MOTOR VEHICLE

(71) Applicant: AUDI AG, Ingolstadt (DE)

(72) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 174 days.

(21) Appl. No.: 14/918,913

(22) Filed: Oct. 21, 2015

(65) Prior Publication Data

US 2016/0115907 A1 Apr. 28, 2016

(30) Foreign Application Priority Data

Oct. 22, 2014 (DE) .......................... 10 2014 015 651
Oct. 1, 2015 (DE) .......................... 10 2015 012 656

(51) Int. Cl.
*B60K 15/035* (2006.01)
*F02M 25/08* (2006.01)

(52) U.S. Cl.
CPC ............... *B60K 15/03519* (2013.01); *B60K 2015/03514* (2013.01); *B60K 2015/03538* (2013.01);
(Continued)

(58) Field of Classification Search
CPC .......................................... B60K 2015/03538
(Continued)

(56) References Cited

U.S. PATENT DOCUMENTS 6,354,280 B1 * 3/2002 Itakura ............. B60K 15/03504
123/198 D
6,488,015 B2 * 12/2002 Isobe ................... F02M 25/089
123/198 D
(Continued)

FOREIGN PATENT DOCUMENTS

CN 102555786 A 7/2012
CN 103429452 A 12/2013
(Continued)

OTHER PUBLICATIONS

Chinese Search Report issued by the Chinese Patent Office in Chinese Application No. 2015106972266 dated Jul. 12, 2017.
(Continued)

*Primary Examiner* — Kevin R Steckbauer
(74) *Attorney, Agent, or Firm* — Henry M. Feiereisen

(57) ABSTRACT

A fuel system for a motor vehicle includes a fuel tank, a filling tube closable by a tank cover; a pressure sensor for measuring a pressure in the fuel tank; an activated carbon filter, a tank isolation valve arranged between the fuel tank and the activated carbon filter, and a control for opening and closing the tank isolation valve, wherein the control opens the tank isolation valve in response to receiving input indicating an intent to refuel and closes the opened tank isolation valve again when the pressure in the fuel tank measured by the pressure sensor falls below a predetermined first pressure threshold value, wherein the control subsequent to the closing of the tank isolation valve opening the closed tank isolation valve again when the pressure in the fuel tank measured by the pressure sensor exceeds the predetermined first pressure threshold value and/or exceeds a predetermined second pressure threshold value, which is higher than the predetermined first pressure threshold value.

20 Claims, 4 Drawing Sheets

(52) U.S. Cl.
CPC ............. *B60K 2015/03566* (2013.01); *B60K 2015/03576* (2013.01); *B60K 2015/03585* (2013.01); *F02M 25/08* (2013.01)

(58) Field of Classification Search
USPC ................................................ 123/516–520
See application file for complete search history.

(56) References Cited

U.S. PATENT DOCUMENTS

| | | | |
|---|---|---|---|
| 6,796,295 B2 | 9/2004 | Kidokoro et al. | |
| 7,152,638 B2* | 12/2006 | Ganachaud | B60K 15/03504 141/198 |
| 7,882,824 B2 | 2/2011 | Hill et al. | |
| 8,019,525 B2* | 9/2011 | DeBastos | B60K 15/03504 123/520 |
| 8,056,540 B2* | 11/2011 | DeBastos | F02M 25/0818 123/520 |
| 8,200,411 B2* | 6/2012 | DeBastos | B60K 15/03504 123/520 |
| 8,215,291 B2* | 7/2012 | DeBastos | F02M 25/0818 123/521 |
| 8,434,461 B2* | 5/2013 | Kerns | F02M 25/089 123/520 |
| 8,447,495 B2* | 5/2013 | Pearce | B60K 15/03504 123/516 |
| 8,485,386 B2* | 7/2013 | Koukan | B60K 15/035 220/4.14 |
| 8,607,765 B2 | 12/2013 | Hagen | |
| 8,931,523 B2 | 1/2015 | Hagen et al. | |
| 8,955,496 B2 | 2/2015 | Hagen | |
| 8,960,473 B2* | 2/2015 | Grun | B60K 15/03504 137/588 |
| 8,967,193 B2 | 3/2015 | Hagen | |
| 9,026,292 B2* | 5/2015 | Lindlbauer | B60K 15/035 701/22 |
| 9,061,581 B2* | 6/2015 | Koukan | B60K 15/035 |
| 9,163,591 B2 | 10/2015 | Hagen | |
| 9,267,467 B2* | 2/2016 | Peters | F02M 25/0854 |
| 9,404,446 B2* | 8/2016 | Fujiwara | F02M 25/0854 |
| 9,457,649 B2* | 10/2016 | Fujiwara | B60K 15/04 |
| 9,488,136 B2* | 11/2016 | Pearce | F02M 25/0809 |
| 9,599,071 B2* | 3/2017 | Dudar | F02M 25/0827 |
| 9,803,595 B2* | 10/2017 | Fujiwara | F02M 25/0854 |
| 9,840,985 B2* | 12/2017 | Martin | F02M 25/0818 |
| 9,908,401 B2* | 3/2018 | Abe | F02M 25/0836 |
| 9,989,018 B2* | 6/2018 | Dudar | F02D 41/0042 |
| 10,040,448 B2* | 8/2018 | Dudar | B60W 20/50 |
| 2002/0153374 A1* | 10/2002 | Isobe | F02M 25/089 220/86.2 |
| 2004/0144443 A1* | 7/2004 | Ganachaud | B60K 15/03504 141/59 |
| 2007/0068595 A1* | 3/2007 | Ganachaud | B60K 15/03504 141/59 |
| 2010/0147863 A1* | 6/2010 | Grun | B60K 15/03504 220/746 |
| 2011/0139804 A1* | 6/2011 | Koukan | B60K 15/035 220/746 |
| 2011/0166765 A1* | 7/2011 | DeBastos | B60K 15/03504 701/102 |
| 2011/0168140 A1* | 7/2011 | DeBastos | F02M 25/0818 123/521 |
| 2011/0265768 A1* | 11/2011 | Kerns | F02M 25/08 123/521 |
| 2011/0290000 A1* | 12/2011 | DeBastos | B60K 15/03504 73/23.31 |
| 2011/0295482 A1* | 12/2011 | Pearce | B60K 15/03504 701/102 |
| 2012/0055452 A1* | 3/2012 | DeBastos | F02M 25/0818 123/521 |
| 2012/0111307 A1 | 5/2012 | Hagen | |
| 2012/0152489 A1 | 6/2012 | Hagen | |
| 2012/0160218 A1 | 6/2012 | Hagen | |
| 2012/0160220 A1 | 6/2012 | Hagen | |
| 2012/0168454 A1 | 7/2012 | Hagen | |
| 2012/0174894 A1 | 7/2012 | Hagen | |
| 2012/0175379 A1 | 7/2012 | Hagen | |
| 2012/0179354 A1 | 7/2012 | Hagen | |
| 2012/0186670 A1 | 7/2012 | Hagen | |
| 2012/0234074 A1 | 9/2012 | Hagen | |
| 2014/0137948 A1 | 5/2014 | Hagen | |
| 2014/0216420 A1 | 8/2014 | Hagen | |
| 2014/0231424 A1* | 8/2014 | Koukan | B60K 15/035 220/4.14 |
| 2015/0032307 A1* | 1/2015 | Lindlbauer | B60K 15/035 701/22 |
| 2015/0068498 A1* | 3/2015 | Peters | F02M 25/0854 123/520 |
| 2015/0083089 A1* | 3/2015 | Pearce | F02M 25/0809 123/520 |
| 2015/0142293 A1* | 5/2015 | Dudar | G01M 15/05 701/101 |
| 2016/0319718 A1* | 11/2016 | Dudar | F02M 25/089 |
| 2016/0356247 A1* | 12/2016 | Dudar | F02M 25/0827 |
| 2017/0008390 A1* | 1/2017 | Dudar | F02M 25/0818 |
| 2017/0015192 A1* | 1/2017 | Abe | F02M 25/0836 |
| 2017/0114733 A1* | 4/2017 | Aghili | F02M 25/0854 |
| 2018/0099856 A1* | 4/2018 | Dudar | B67D 7/049 |
| 2018/0099859 A1* | 4/2018 | Dudar | B67D 7/342 |
| 2018/0327249 A1* | 11/2018 | Dudar | B67D 7/342 |

FOREIGN PATENT DOCUMENTS

| | | |
|---|---|---|
| CN | 103635682 A | 3/2014 |
| CN | 103963631 A | 8/2014 |
| DE | 199 13 440 | 10/2000 |
| DE | 10 2009 009 901 A1 | 8/2010 |
| DE | 10 2010 018 126 A1 | 11/2011 |
| DE | 102010064960 | 6/2012 |
| DE | 102011015999 | 10/2012 |
| EP | 2 993 069 | 6/2017 |

OTHER PUBLICATIONS

English translation of Chinese Search Report issued by the Chinese Patent Office in Chinese Application No. 2015106972266 dated Jul. 12, 2017.

* cited by examiner

FUEL SYSTEM FOR A MOTOR VEHICLE

CROSS-REFERENCES TO RELATED APPLICATIONS

This application claims the priority of German Patent Application, Serial No. 10 2014 015 651.6 filed Oct. 22, 2014, pursuant to 35 U.S.C. 119(a)-(d), the disclosure of which is incorporated herein by reference.

BACKGROUND OF THE INVENTION

The present invention relates to a fuel system for a motor vehicle.

The following discussion of related art is provided to assist the reader in understanding the advantages of the invention, and is not to be construed as an admission that this related art is prior art to this invention.

Hybrid vehicles and in particular so-called plug-in hybrids that are equipped with an internal combustion engine and an electric machine and in which electro-motoric operation predominates, are often equipped with a fuel tank, which is configured as a pressure tank, in which an operating pressure is present which is higher than the ambient pressure. The increased operating pressure enables reducing outgassing of hydrocarbon vapors from the liquid fuel into the tank. As a result the activated carbon filter is loaded to a lesser degree with hydrocarbon vapors and thus does not have to be regenerated as often, which is only possible during operation of the internal combustion engine. Prior to refueling of such a pressure tank, however, the operating pressure has to be reduced so that the tank pressure is only slightly above ambient pressure. Only then a tank cover, which closes the filling tube, can be opened and the fuel tank can be filled with fuel. For this purpose a tank cover opener or control switch, whose actuation indicates an intent to refuel, can be provided in the motor vehicle. The control then initiates a pressure decrease in the fuel tank by opening the tank isolation valve (FTIV), which is a part of a tank ventilation device of the fuel tank. The pressure decrease in the fuel tank is detected by a pressure sensor and is transmitted to the control device. After the pressure compensation has occurred or when the pressure in the fuel tank has almost reached ambient pressure, and with this the readiness for refueling is established, the control device unlocks a tank flap behind which the tank cover is arranged. This prevents the tank cover from being opened when there is still an increased pressure in the fuel tank.

In motor vehicles of the applicant with hybrid drive, currently two different variants of fuel systems with a pressure tank, a tank isolation valve and an activated carbon filter are used. In the first variant, the tank isolation valve is arranged above the fuel tank and communicates via a liquid separator (liquid trap) within the fuel tank with a quick-venting valve in the head- or gas space of the fuel tank, which head- or gas space is also connected with the filling tube through a refueling venting line and a compensation container. In this variant the venting of the fuel tank occurs in a different manner during operation than during refueling of the fuel tank. While during operation, hydrocarbons vapors, which are generated due to an increase of the ambient temperature and the resulting evaporation of fuel, are discharged from the fuel tank through the quick-venting valve, the liquid separator, the tank isolation valve and the downstream arranged activated carbon filter, the hydrocarbon vapors displaced during refueling from the head- or gas space of the fuel tank are conducted through the refueling-venting line back into the filling tube, where they are suctioned off by means of the gas return of the fuel nozzle. As a result of the separation of the operating-venting and refueling-venting in this first variant, the quick-venting valve has to be arranged above the switch-off level of the fuel tank. In order to prevent overfilling of the fuel tank through the quick-venting valve, the tank isolation valve therefore has to be closed during refueling. This enables preventing loading of the activated carbon filter with hydrocarbon vapors during refueling, which in hybrid vehicles has the advantage that the activated carbon filter has to be regenerated less often. However, in this variant hot ambient conditions may lead to a spontaneous pressure increase in the fuel tank when the tank isolation valve is closed for the refueling process prior to opening the tank cover. When the tank flap is already unlocked, this may lead to pressurized hydrocarbon vapors in the fuel tank being abruptly discharged when opening the tank cover and being blown into the face of the driver.

In the second variant, the tank isolation valve and the activated carbon filter are connected to the filling tube, which has a separator function, while the quick-venting valve serves as shutoff valve for limiting the fuel level. In this variant the fuel tank is vented during operation and also during refueling by way of the tank isolation valve. Therefore the tank isolation valve has to be open during refueling so that the hydrocarbon vapors that are displaced from the head- or gas space can reach the downstream arranged activated carbon filter for being absorbed. Because the fuel tank is vented during refueling in the manner of a vapor recovery via the head of the filling tube, overfilling can be prevented. However, because the filling tube serves as liquid separator, carryover of liquid fuel through the open tank isolation valve into the activated carbon filter during refueling cannot be fully avoided in this variant.

It would therefore be desirable and advantageous to provide an improved fuel system to overcome the problems of the two variants by way of a control.

SUMMARY OF THE INVENTION

According to one aspect of the present invention, a fuel system for a motor vehicle includes a fuel tank, a filling tube closable by a tank cover; a pressure sensor for measuring a pressure in the fuel tank; an activated carbon filter, a tank isolation valve arranged between the fuel tank and the activated carbon filter, and a controller, hereinafter referred to as a control for opening and closing the tank isolation valve, wherein the control opens the tank isolation valve in response to receiving input indicating an intent to refuel and closes the opened tank isolation valve again when the pressure in the fuel tank measured by the pressure sensor falls below a predetermined first pressure threshold value, wherein the control subsequent to the closing of the tank isolation valve opening the closed tank isolation valve again when the pressure in the fuel tank measured by the pressure sensor exceeds the predetermined first pressure threshold value and/or exceeds a predetermined second pressure threshold value, which is higher than the predetermined first pressure threshold value.

In the case of the first variant described above with a refueling-venting line through which the fuel vapors displaced during refueling are conducted back into the filling tube, the predetermined first pressure threshold is preferably about 25 mbar, wherein in this case the control opens the closed tank isolation valve again when the pressure in the fuel tank measured by the pressure sensor exceeds a predetermined second pressure threshold of preferably about 50 mbar.

Advantageously in this variant the control can repeatedly close the opened tank isolation valve at opened tank cover, when the pressure in the fuel tank measured by the pressure sensor falls below the predetermined first pressure threshold, and opens the tank isolation valve when the pressure exceeds the predetermined second pressure threshold. In this variant the control keeps the tank isolation valve closed during refueling.

In the case of the second variant, in which the tank is vented during refueling through the opened tank isolation valve and the activated carbon filter, a predetermined first pressure threshold is preferably about 5 mbar, wherein in this case the control subsequently opens the closed tank isolation valve again when the pressure in the tank measured by the pressure sensor exceeds the predetermined first pressure threshold of about 5 mbar again.

In the case that the closed tank isolation valve does not open again at the first pressure threshold of about 5 mbar, a worst-case-scenario can be guarded against in this variant in that the control opens the tank isolation valve when the pressure in the fuel tank measured by the pressure sensor exceeds the predetermined second threshold value, which in this case is also about 50 mbar. In this variant the control keeps the tank isolation valve open during refueling.

In order to be able to differentiate between a slow pressure increase in the fuel tank due to residual outgassing on one hand and a rapid pressure increase in the fuel tank directly attributable to a late refueling effect on the other hand, the control analyzes the gradient of the pressure increase from the predetermined first pressure threshold to the predetermined second pressure threshold and opens the tank isolation valve when the predetermined second pressure threshold is reached only in the case of a slow pressure increase.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
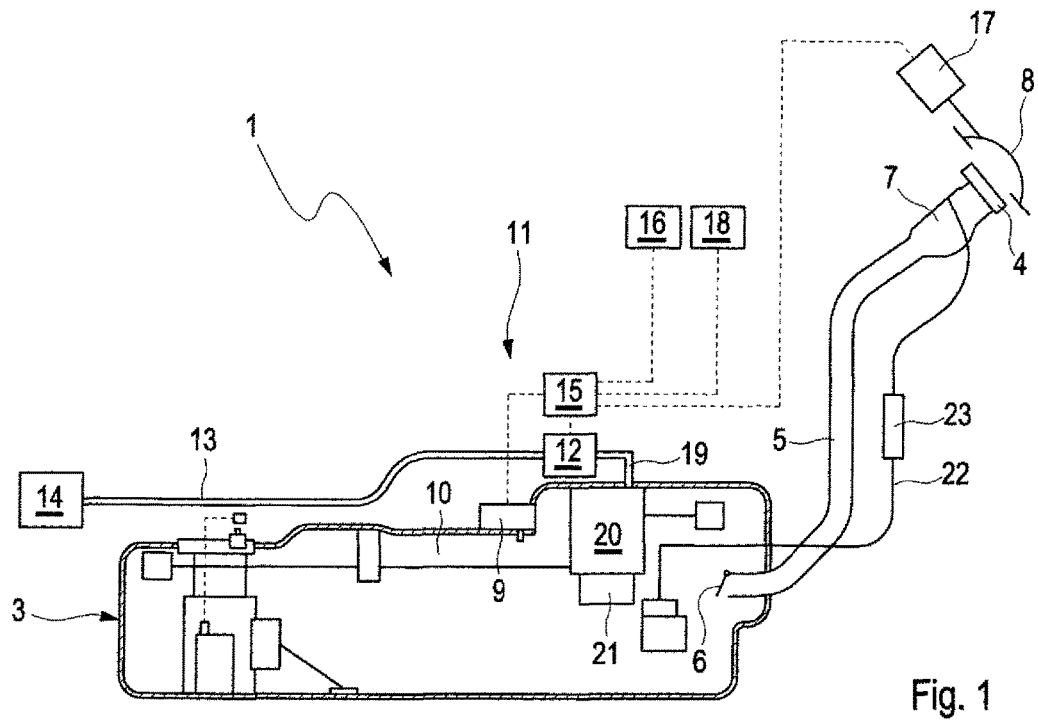
FIG. 1 shows a schematic view of a first variant of an inventive fuel system of a hybrid vehicle.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
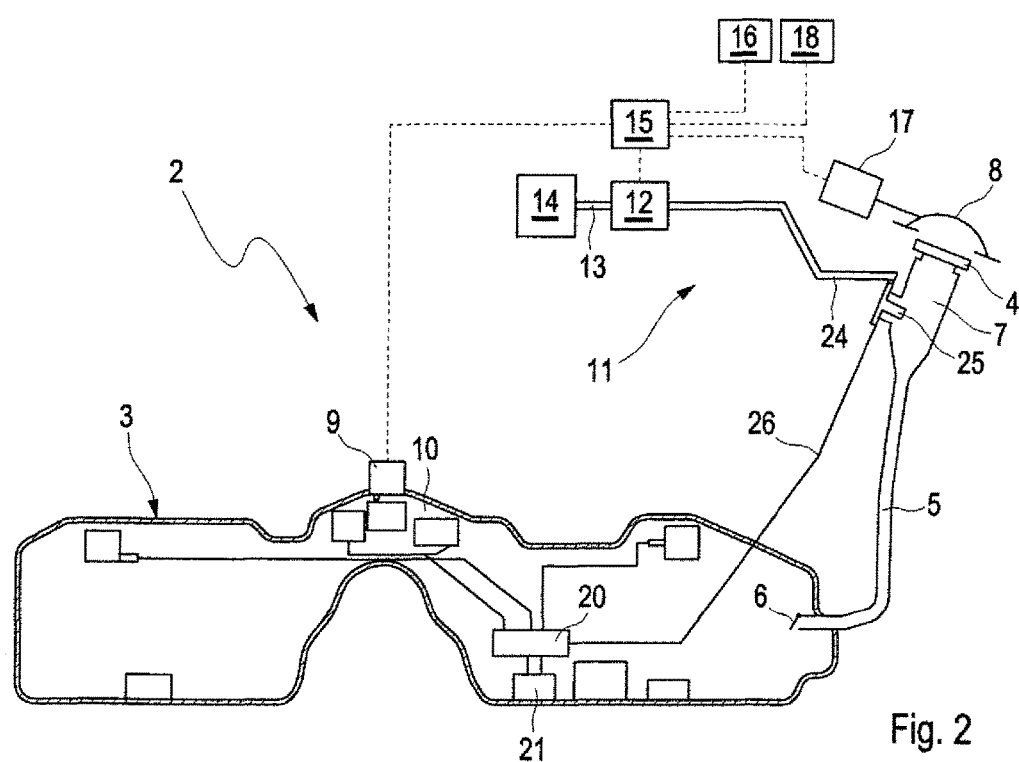
FIG. 2 shows a schematic view of a second variant of an inventive fuel system of a hybrid vehicle.

FIG. 1 shows a first variant of the fuel system, and FIG. 2 shows a second variant of the fuel system. Both fuel systems 1, 2, which are only partially shown in FIGS. 1 and 2, include a filling tube 5, which can be closed with a tank cover 4 and is provided with a flap 6 on the lower end. The upper end of the filling tube 5, which is configured as filling socket 7, together with the tank cover 4 is located behind a tank flap 8. The tank flap 8 is normally locked and is opened prior to refueling the fuel tank 3 in order to enable screwing off of the tank cover 4. On the topside the fuel tank 3 is provided with a pressure sensor 9, which measures the pressure in the head- or gas space 10 of the fuel tank 3.

The two fuel systems 1, 2 are each equipped with a tank venting device 11, which during refueling of the motor vehicle and during rise of the ambient temperature, enables venting of the fuel tank 3. The tank venting device 11 includes a tank isolation valve 12 arranged outside the tank and an activated carbon filter 14, which is connected with the tank isolation valve 12 through a venting line 13. During operation, the tank isolation valve 12 is normally closed and is only opened when the pressure in the head- or gas space 10 of the fuel tank 3 exceeds a settable overpressure threshold value, for example due to a temperature increase, or falls below a settable under-pressure threshold value due to a temperature decrease, to thereby avoid excessive stress on the fuel tank 3. In the representations of the fuel tank in FIGS. 4 to 7, the settable overpressure threshold value is about 300 mbar. The activated carbon filter 14 prevents volatile hydrocarbons (HC) from escaping into the environment during venting of the fuel tank 3. For this purpose the activated carbon filter has a filling of activated carbon, which absorbs the volatile hydrocarbons (HC). The activated carbon filter is regenerated by suctioning ambient air through the activated carbon filter 14 into an intake tract of the internal combustion engine, in order to purge the activated carbon filter 14 and to combust the volatile hydrocarbons in the combustion chambers of the internal combustion engine, which is only possible during operation of the internal combustion engine.

Both fuel systems 1, 2 further include a controller, hereinafter referred to as a control 15, which inter alia controls the tank isolation valve 12 for opening and closing the same. The control 15 can be integrated in a motor control unit of the internal combustion engine and communicates with the pressure sensor 9 in order to open and close the tank isolation valve 12 in dependence on the pressure in the fuel tank 3. The control 15 further communicates with a control switch 16 arranged in the interior of the motor vehicle, with which the driver communicates his intent to refuel to the control 15. The control 15 also communicates with an unlocking mechanism 17 for unlocking the tank flap 8 and with a display 18 on the instrument panel of the motor vehicle.

Figure 3:
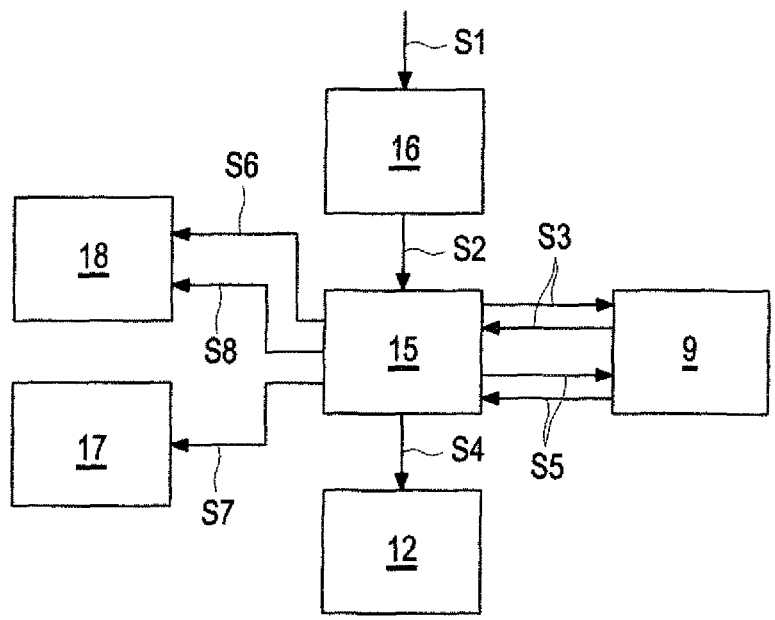
FIG. 3 shows a schematic flowchart of steps between an indication of an intent to refuel and a refueling of a fuel tank of the two fuel systems.
Figure 4:
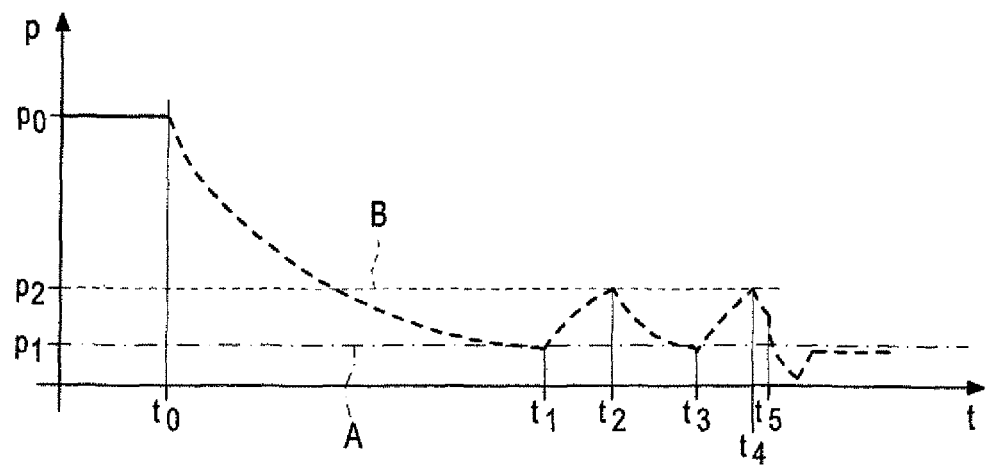
FIG. 4 shows a representation of the tank pressure over time between the indication the intent to refuel and a refueling of the fuel tank in the first variant.
Figure 5:
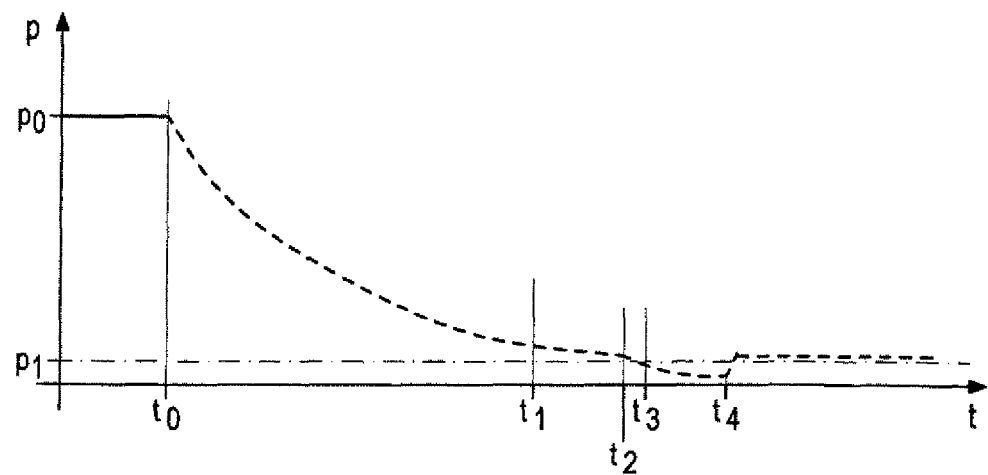
FIG. 5 shows a representation of the tank pressure over time between the indication of the intent to refuel and the refueling of the fuel tank in the second variant.
Figure 6:
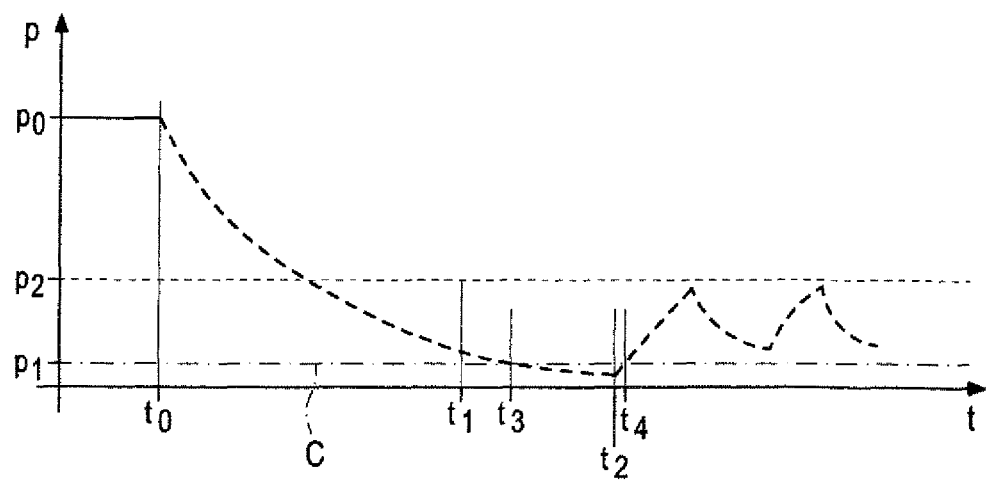
FIG. 6 shows a further representation of the tank pressure over time between the indication of the intent to refuel and the refueling of the fuel tank in the second variant.

The interaction of the control 15 with the pressure sensor 9, the tank isolation valve 12, the control switch 16, the unlocking mechanism 17 and the display 18 is schematically shown in FIG. 3. When the driver, in a step S1, signals his intent to refuel by actuating the control switch 16, this intent to refuel is transmitted to the control 15 in a second step S2. To determine the pressure in the fuel tank 3, the control 15 receives input from the sensor 9 in a step S3. When this pressure is higher than the ambient pressure, the control 15 opens the tank isolation valve 12 in a fourth step S4 in order to decrease the pressure. In a fifth step S5 the control 15 monitors the pressure decrease by means of the pressure sensor 9, which pressure decrease lasts about 0.5 to 10 s depending on the pressure and the fill level in the fuel tank 3. When a pressure of about 25 mbar is reached, the control 15 signals in a sixth step S6 readiness for refueling to the driver via the display. In a seventh step S7 the control 15 actuates the unlocking mechanism 17 in order to unlock the tank flap 8, and in a step S8 displays the unlocking of the tank flap 8 to the driver on a display 18. This process is intended to ensure that the tank cover 4 can only be opened at a low pressure in the fuel tank 3. The pressure course in the fuel tank 3 during the steps S1-S7 is shown in FIGS. 4 to 6 between the time points t0 and t1, wherein at the time point t0 a pressure p0 of about 300 mbar and at the time point t1 a pressure p1 of about 25 mbar is present in the fuel tank 3. After opening the tank cover 4 the driver can then commence refueling.

In the fuel system 1 according to the first variant shown in FIG. 1 the tank isolation valve 12 arranged above the fuel tank 3 communicates via a venting line 19 with a liquid separator (liquid trap) 20 which is arranged in the fuel tank 3, and which prevents liquid fuel from being entrained and conducted to the activated carbon filter 14, and further communicates with a quick-venting valve 21 arranged above the switch-off level hi the head- or gas space 10 of the fuel tank 3. In the first variant, the head- or gas space 10 is further connected with the upper end of the filling tube 5 below the tank cover 4 by a refueling venting line 22 and a compensation container 23.

In the first variant the fuel tank 3 is vented during operation of the motor vehicle by the quick-venting valve 21, the liquid separator 20, the tank isolation valve 12 and the downstream arranged activated carbon filter 14. During refueling on the other hand, the fuel tank 3 is vented through the refueling-venting line 22 and the filling tube 5, from which the hydrocarbon vapors, which are displaced from the head- or gas space during refueling, are suctioned by means of the gas return of the fuel nozzle.

In order to avoid overfilling of the fuel tank 3 through the quick-venting valve 21 and a loading of the activated carbon filter 14 with hydrocarbon vapors during refueling in this variant, the control 15 closes tank isolation valve 12 prior to refueling, after the pressure p in the fuel tank 3 has decreased to the value p1 of about 25 mbar, which in the following is referred to as predetermined first pressure threshold and is indicated in FIG. 4 by a dash-dotted line A. The tank isolation valve 12 then remains closed during the entire refueling process.

When the tank isolation valve 12 is closed after the tank flap 8 is unlocked but prior to opening the tank cover 4, a spontaneous pressure buildup may occur in the fuel tank 3 under hot environmental conditions. This can lead to the fact that the pressurized hydrocarbons in the fuel tank 3 abruptly escape when unscrewing the tank cover 4 and are blown into the face of the driver.

In order to prevent this, in the fuel system 1 the control 15 opens the closed tank isolation valve 12 again when the pressure p in the fuel tank 3 measured by the pressure sensor 9 exceeds a predetermined second pressure threshold value p2 of about 50 mbar, which in FIG. 4 is indicated by a dashed line B. This process is shown in FIG. 4 at the time point t2. After opening the tank isolation valve 12, the pressure p in the fuel tank 3 decreases again to the first pressure threshold value p1 of about 25 mbar at which the tank isolation valve 12 is closed again, as shown in FIG. 4 at the time point t3. Should the pressure p subsequently increase again to the predetermined second pressure threshold value p2 of about 50 mbar, the tank isolation valve 12 is opened again when the pressure threshold value p2 is reached, as shown in FIG. 4 at the time point t4. When then, at opened tank isolation valve 12, the tank cover 4 is screwed off as shown in FIG. 4 at the time point t5, an abrupt discharge of fuel vapors is not possible. The same applies when the tank cover 4 is screwed off at a closed state of the tank isolation valve 12 because in both cases the pressure p in the fuel tank 3 is below the predetermined second pressure threshold value p2 of about 50 mbar.

Subsequently, refueling is performed at closed tank isolation valve 12, wherein due to venting of the tank through the refueling venting line 22 and the filling tube 5, the pressure p in the fuel tank 3 does not increase above the first pressure threshold value p1 of about 25 mbar.

In the fuel system 2 shown in FIG. 2 according to the second variant, the tank isolation valve 12 is connected to the filling tube 5 by a venting line 24. For this a fitting 25 protrudes into the filling socket 7, which on one hand communicates with the ventilation line 24 and on the other hand through a venting line 26 with the liquid separator 20 in the fuel tank 3. In this variant venting of the fuel tank 3 occurs also during refueling through the tank isolation valve 12, which therefore has to be opened during the refueling in order to prevent pressure buildup in the tank 3.

Generally, however, it is also the goal in the second variant to hold the tank isolation valve 12 closed during refueling of the fuel tank 3 in order to conduct the hydrocarbon vapors, which were displaced from the fuel tank 3, out of the filling tube 5 into the fuel nozzle (gas recovery) and avoid an unnecessary loading of the activated carbon filter 14. Beside the readjustment, which was described above with reference to FIG. 4 and the fuel system 1 according to the first variant, a second alternative exists for this purpose, which is described in the following with reference to the fuel system 2 according to the second variant and FIGS. 5 and 6.

In this alternative the tank isolation valve 12 is not closed when the pressure p in the fuel tank 3 has decreased to about 25 mbar but remains open past the time point t1 of the unlocking of the tank flap 8. As shown in FIGS. 5 and 6 this causes the pressure p in the fuel tank to decrease again after the time point t1 until it reaches a predetermined first pressure threshold p1 at the time point t3, which is about 5 mbar, indicated in FIGS. 5 and 6 by a dash-dotted line C.

When reaching this predetermined first pressure threshold value p1 of about 5 mbar, the tank isolation valve 12 can be closed without the risk of a subsequent unwanted pressure buildup in the tank 3. This has two reasons: the first reason is that at the predetermined first pressure threshold p1 of about 5 mbar usually a state is reached at which residual outgassing no longer occurs, for example because the fuel pump is turned off or the temperature of the fuel is lower than a critical outgassing temperature of the fuel of about 35° C. The second reason is that when the predetermined first pressure threshold value p1 is reached, a device for recognizing the opening of the tank cover 4 has recognized that the tank cover is screwed off or opened. In this case the fuel tank 3 can be vented to the atmosphere through the filling tube 7, which renders a subsequent pressure buildup impossible. Even when the tank isolation valve 12 is closed at the time point t3, the pressure p in the fuel tank 3 will then continue to decrease due to the screwed off tank cover 4 in spite of a potential continued outgassing, as shown in FIGS. 5 and 6 between the time points t3 and t4.

Therefore the tank isolation valve 12 is closed when the pressure p in the fuel tank 3 reaches the predetermined first pressure threshold p1 of about 5 mbar. The control 15, however, opens the closed tank isolation valve 12 again as soon as the pressure p in the fuel tank measured by the pressure sensor 9 exceeds the predetermined first pressure threshold value p1 of abut 5 mbar again, as for example shown at the time point t4 in FIGS. 5 and 6. During the refueling, the tank isolation valve 12 of the fuel system 2 according to the second variant remains open, as shown in FIG. 5 after the time point t4.

As shown in FIG. 6 it is also possible to take guard against a worst-case-scenario in which the tank isolation valve 12 does not open again when the predetermined first pressure threshold value p1 of about 5 mbar is exceeded. In this case, as illustrated in the first variant shown in FIG. 4, a predetermined second pressure threshold value p2 of abut 50 mbar can be provided, at which the control 15 sends a further opening signal to the tank isolation valve 12 when a pressure above the first pressure threshold value p1 of about 5 mbar builds up in the fuel tank 3. As in the first variant, the process of the opening and closing of the tank isolation valve 12 can be repeated as needed as shown in FIG. 6.

The above-described pressure increase in the fuel tank 3 can generally have two causes, i.e., on one hand the already mentioned outgassing in which liquid fuel in the fuel tank 3 outgasses or evaporates, but on the other hand can also be directly attributable to refueling, in which toward the end of the refueling process the level of liquid fuel in the filling tube 5 and with this, due to the hydrostatic or geodetic pressure of the liquid fuel, also the pressure in the fuel tank 3 rises very rapidly, which then leads to a refueling switch-off process, i.e., a switch-off of the fuel nozzle.

Figure 7:
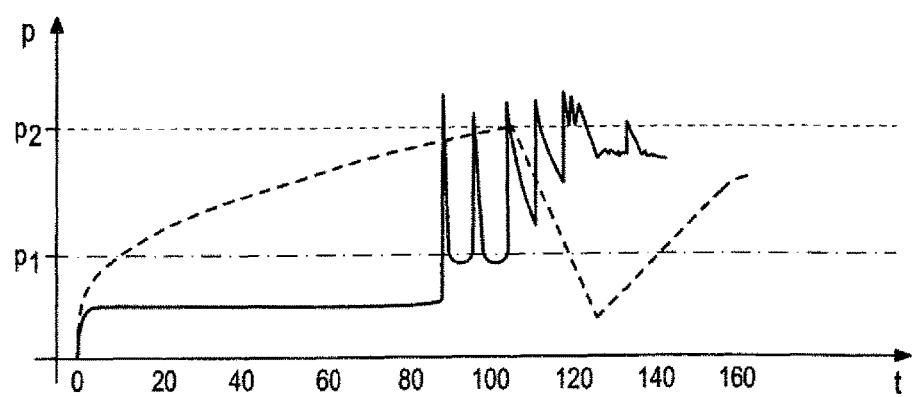
FIG. 7 shows a representation of the tank pressure during alternately opening and closing of the tank isolation valve during over-refueling.

When in this latter case of a pressure increase caused by refueling, the tank isolation valve 12 is opened when reaching the predetermined second pressure threshold value p2 of about 50 mbar and is closed again when reaching the predetermined first pressure threshold value p1 of about 25 mbar, as described above with reference to FIG. 4 and FIG. 6, this would lead to a pressure course in the tank 3 as indicated in solid lines in FIG. 7. As can be seen in FIG. 7 in this case the pressure p in the fuel tank 3 would be subject to very fast pressure fluctuations between the predetermined pressure threshold p1 and the predetermined second pressure threshold p2.

In the case of a pressure increase caused by a late refueling effect, an opening of the tank isolation valve 12 is not desired, however, because this would lead to a carryover of fuel from the filling tube 5 into the activated carbon filter 14, especially in the fuel system 2 shown in FIG. 2. Because this has to be avoided as far as possible, the gradient or the slope of the pressure increase dp/dt between the predetermined first pressure threshold p1 and the predetermined second pressure threshold p2 is analyzed to differentiate between a pressure increase caused by residual outgassing and a pressure increase caused by a late refueling effect. When this pressure increase is slow, as shown with the dashed line in FIG. 7, for example within a time period of more than 5 seconds, and therefore dp/dt is below a predetermined threshold, the control 15 determines that the pressure increase was caused by a residual outgassing and opens the tank isolation valve 12 when the predetermined second pressure threshold p2 is reached. When on the other hand the pressure increase is fast, for example within a time period of less than 5 seconds, and therefore dp/dt is above a predetermined threshold value, the control 15 determines that the pressure increase was caused by a late refueling effect and holds the tank isolation valve 12 closed when the predetermined second threshold value p2 is reached.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A fuel system for a motor vehicle, said fuel system comprising:
    a fuel tank configured as a pressure tank and provided with a venting line for venting the fuel tank,
    a filling tube closable by a tank cover;
    a pressure sensor for measuring a pressure in the fuel tank;
    an activated carbon filter;
    a tank isolation valve arranged between the fuel tank and the activated carbon filter in the venting line for venting the fuel tank, wherein the venting line for venting the fuel tank is separate from the filling tube; and
    a controller configured to open and close the tank isolation valve, said controller configured to: open the tank isolation valve in response to receiving input indicating an intent to refuel and subsequently close the opened tank isolation valve again in response to determining that the pressure in the fuel tank measured by the pressure sensor falls below a predetermined first pressure threshold value; and subsequent to the closing of the tank isolation valve open the closed tank isolation valve again in response to determining that the pressure in the fuel tank measured by the pressure sensor exceeds the predetermined first pressure threshold value and exceeds a predetermined second pressure threshold value, said predetermined second pressure threshold value being higher than the predetermined first pressure threshold value;
    wherein the filling tube is connected with a head or gas space of the fuel tank through a refueling venting line which is directly connected to a fitting of the filling tube, and the venting line for venting the fuel tank is also directly connected to the fitting of the filling tube.

2. The fuel system of claim 1, wherein the predetermined first pressure threshold value is about 25 mbar.

3. The fuel system of claim 1, wherein the predetermined second pressure threshold value is about 50 mbar.

4. The fuel system of claim 1, wherein the controller repeatedly closes the tank isolation valve in response to the pressure in the tank falling below the predetermined first pressure threshold value and repeatedly opens the tank isolation valve in response to the pressure in the tank exceeding the predetermined first pressure threshold value and exceeding the predetermined second pressure threshold value.

5. The fuel system of claim 1, wherein the controller keeps the tank isolation valve closed during the refueling.

6. The fuel system of claim 1, wherein the predetermined first pressure threshold value is about 5 mbar.

7. The fuel system of claim 1, wherein the controller opens the tank isolation valve again in response to the pressure in the fuel tank exceeding the first pressure threshold value and exceeding the predetermined second pressure threshold value.

8. The fuel system of claim 7, wherein the controller actuates the tank isolation valve again for opening in response to the pressure in the fuel tank exceeding the first pressure threshold value and exceeding the predetermined second pressure threshold value.

9. The fuel system of claim 1, wherein the controller holds the tank isolation valve open during the refueling.

10. The fuel system of claim 1, wherein the controller analyzes a gradient of the pressure increase from the predetermined first pressure threshold value to the predetermined second pressure threshold value.

11. A fuel system for a motor vehicle, said fuel system comprising:
    a fuel tank configured as a pressure tank;
    an activated carbon filter;
    a tank venting line communicating with an interior of the fuel tank for venting the fuel tank, said tank venting line extending from the fuel tank to the activated carbon filter;
    a filling tube closable by a tank cover and extending into the fuel tank;
    a pressure sensor for measuring a pressure in the fuel tank;
    a tank isolation valve arranged in the venting line between the fuel tank and the activated carbon filter;
    a refueling venting line extending into the interior of the fuel tank and not having a direct connection with the tank venting line; and
    a controller configured to open and close the tank isolation valve, said controller configured to: open the tank isolation valve in response to receiving input indicating an intent to refuel and subsequently close the opened tank isolation valve again in response to determining that the pressure in the fuel tank measured by the pressure sensor falls below a predetermined first pressure threshold value; and subsequent to the closing of the tank isolation valve open the closed tank isolation valve again in response to determining that the pressure in the fuel tank measured by the pressure sensor exceeds the predetermined first pressure threshold value and exceeds a predetermined second pressure threshold value, said predetermined second pressure threshold value being higher than the predetermined first pressure threshold value.

12. The fuel system of claim 11, wherein the predetermined first pressure threshold value is about 25 mbar.

13. The fuel system of claim 11, wherein the predetermined second pressure threshold value is about 50 mbar.

14. The fuel system of claim 11, wherein the controller repeatedly closes the tank isolation valve in response to the pressure in the tank falling below the predetermined first pressure threshold value and repeatedly opens the tank isolation valve in response to the pressure in the tank exceeding the predetermined first pressure threshold value and exceeding the predetermined second pressure threshold value.

15. The fuel system of claim 11, wherein the controller keeps the tank isolation valve closed during the refueling.

16. The fuel system of claim 11, wherein the predetermined first pressure threshold value is about 5 mbar.

17. The fuel system of claim 11, wherein the controller opens the tank isolation valve again in response to the pressure in the fuel tank exceeding the first pressure threshold value and exceeding the predetermined second pressure threshold value.

18. The fuel system of claim 17, wherein the controller actuates the tank isolation valve again for opening in response to the pressure in the fuel tank exceeding the first pressure threshold value and exceeding the predetermined second pressure threshold value.

19. The fuel system of claim 11, wherein the controller holds the tank isolation valve open during the refueling.

20. The fuel system of claim 11, wherein the controller analyzes a gradient of the pressure increase from the predetermined first pressure threshold value to the predetermined second pressure threshold value.

* * * * *